June 17, 1969     J. V. CALISHER     3,450,424
SELF-LOCKING COUPLING
Filed Dec. 24, 1964
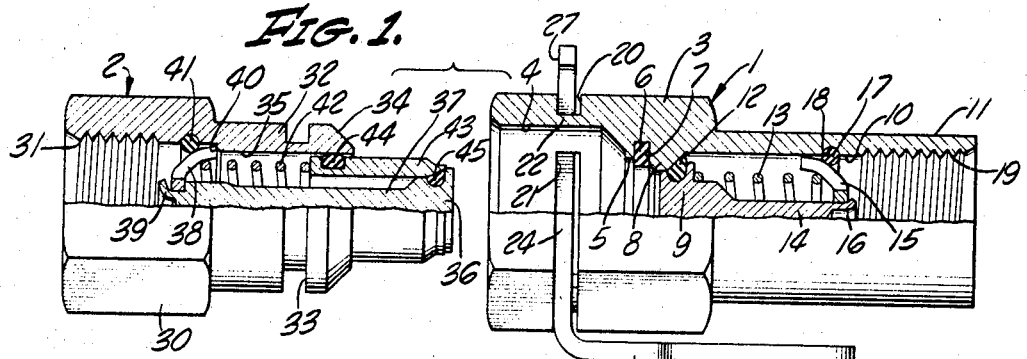
FIG. 1.
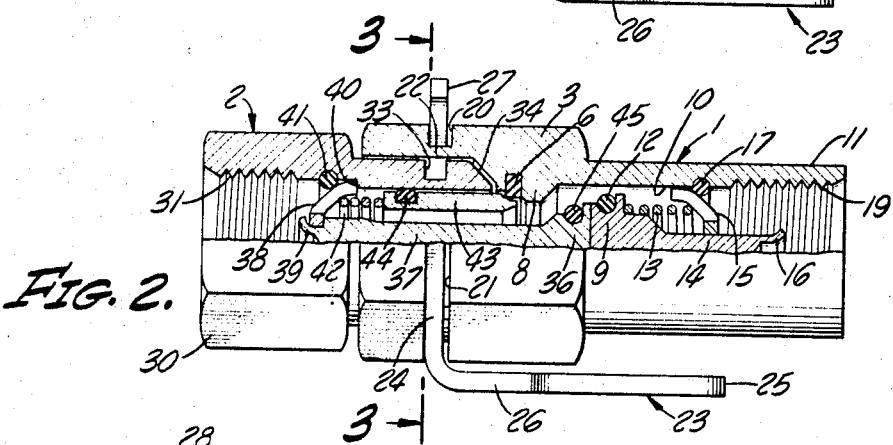
FIG. 2.
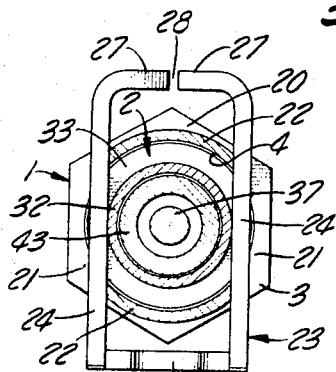
FIG. 3.
FIG. 4.
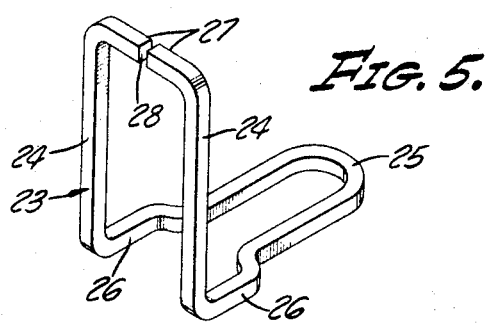
FIG. 5.
INVENTOR.
JAY V. CALISHER
BY
Paul A. Weilein
ATTORNEY United States Patent Office 3,450,424
Patented June 17, 1969

3,450,424
SELF-LOCKING COUPLING
Jay V. Calisher, Montebello, Calif., assignor to E. B.
 Wiggins, Inc., Los Angeles, Calif., a corporation of
 California
Filed Dec. 24, 1964, Ser. No. 420,982
Int. Cl. F16l 37/00
U.S. Cl. 285—305                           2 Claims

ABSTRACT OF THE DISCLOSURE

A quick connect and disconnect coupling having interengaging male and female coupling parts, and a resilient locking member which includes a pair of locking arms straddling and rotatable relative to the female part between a locking position, wherein the arms project laterally through diametrically opposed chordal openings in the female part into an external locking groove in the male part to lock the coupling parts against axial separation, and an unlocking position, wherein the arms straddle and are spread to disengage the male part by intervening body sections on the female part between the chordal openings.

---

The present invention relates to couplings and more particularly to a coupling which is adapted to automatically interconnect the complemental coupling sections upon engagement of one within the other, and which may be easily released to enable uncoupling of the parts.

Heretofore, couplings have been provided having means to facilitate quick connection and disconnection of the coupling parts by the utilization of resiliently operable latching elements. The present invention relates to a coupling of this general type, and a primary object of the invention is to provide such a coupling having novel resilient latch or locking means operable to automatically interlock with the coupling parts upon insertion of one of the parts into the other but which, responsive to a simple manual manipulation of the locking element, releases the coupling parts for disconnection when desired.

A further object is to provide such a coupling wherein the resilient locking member comprises a spring element having a pair of arms revolvably disposed and extending transversely of the coupling part in an annular groove formed exteriorly of one of the coupling parts and providing axially spaced abutment surfaces for retention of the arms, the latter part being provided with chordal openings at diametrically opposite locations, whereby portions of the arms may be disposed within the bore of the coupling part in the chordal openings so as to be automatically engaged by a complemental coupling part having a shoulder to be engaged by the spring arms to retain the coupling parts in a connected relationship, but the spring member being revolvable whereby the intervening body portions of the first mentioned coupling part which are disposed between the chordal openings will cam the spring arms outwardly to release the coupling parts for disconnection.

In more detail, an object of the invention is to provide a quick connect and disconnect coupling as referred to in the next preceding paragraph wherein the locking spring member is so constructed that it may be easily rotated about its supporting coupling part.

Still another object is to provide a coupling of the aforementioned type which includes valve means for automatically closing each coupling part when the coupling is disconnected, but wherein the valve closures for the respective coupling parts are opened upon coupling of the body parts.

Other objects and advantages of the invention will be hereinafter described or will become apparent to those skilled in the art, and the novel features of the invention will be defined in the appended claims.

In the accompanying drawing:

FIG. 1 is a composite view partly in elevation and partly in section showing the complemental coupling parts of the present invention in a disconnected relationship;

FIG. 2 is a view partly in elevation and partly in longitudinal section illustrating the coupling parts of FIG. 1 in connected relation;

FIG. 3 is a transverse sectional view taken on the line 3—3 of FIG. 2;

FIG. 4 is a view corresponding to FIG. 3 but illustrating the spring locking device in a position at which the coupling parts are released for disconnection; and FIG. 5 is a detail perspective view illustrating the spring locking device of the present invention.

Like reference characters in the several views of the drawing and in the following description designate corresponding parts.

Referring to FIG. 1, the coupling of the present invention is illustrated as comprising a pair of complemental coupling parts consisting of a female coupling part generally denoted at 1 and a male coupling part generally denoted at 2.

Coupling part 1 comprises a body 3 which may be of suitable contour such as hexagonal, to facilitate manually gripping the same. Within the body 3 is a bore 4 leading to a reduced diameter bore section 5 having sealing means comprising a resilient seal ring 6 seated in a groove 7. Inwardly of the seal ring 6 the body 3 is provided with a valve seat 8 adapted to be engaged by a valve head 9 reciprocably disposed within a passage 10 extending through a neck 11 formed on the body 3. The valve head 9 has a resilient sealing element 12 adapted to seat against the valve seat 8 under the influence of a coiled spring 13 which is disposed about a stem 14 on the valve head and engaged with the head 9 at one end and abuts against a centering spider 15 at the other end. This spider 15 is suitably connected to the outer extremity of the stem 14 as by means of peaning a retaining flange 16 into engagement with the inner margin of the spider. The spider 15 is retained in position in the passage 10 by a resilient retainer ring 17 adapted to seat in a groove 18 formed within the neck 11. It will also be understood that fluid pressure will act upon the valve head 9 to cause the same to sealingly engage the seat 8, such pressure being derived from any suitable conduit to which the coupling part 1 may be connected as by means of threads 19 which illustratively are formed within the neck 11 at the outer extremity of the latter.

Intermediate the ends of the body 3 and within the region transcended by the bore 4, the body 3 is provided with an annular groove 20, and at diametrically opposite locations the body 3 is formed with chordal openings 21 within the groove 20 whereby arcuate intervening body sections 22 within the groove 20 are provided. A spring wire locking member generally denoted at 23 is associated with the coupling part 1, this locking member having a pair of arms 24, 24 disposed in parallel relation and interconnected by an intermediate section 25 which is disposed substantially at a right angle to the arms 24. The intermediate spring wire section 25 is generally U-shaped and is flared outwardly as at 26 adjacent the juncture with the arms 24. At the free extremities of the arms 24 they are provided with end projections 27, 27 bent at a right angle to the arms 24 and projecting towards one another, the arms of the spring locking element being expansible and contractible as permitted by a line of separation of the end projections 27 as designated at 28. The arms 24 are of sufficient length as to transversely span the body 3 with the arms 24 disposed in the groove 20, the locking element being revolvable within the groove 20 relative to the body 3, and such revolution of the locking element being facilitated by section 25 thereof which extends longitudinally alongside the body 3 so as to be manually engaged, as by the thumb of one manipulating the coupling while the body 3 is gripped within the hand. The lateral space between the arms 24 of the spring locking element is preferably such that in an unstressed condition these arms will be disposed in parallel relation when extended through the chordal openings 21 referred to above, the arms therefor, as shown in FIG. 3, more particularly extending chordally through the bore 4 at diametrically opposite locations.

However, when the spring locking element is rotated approximately 90° from the position shown in FIG. 3 to the position shown in FIG. 4, it will be noted that the arcuate intervening body sections 22 will serve to cam the spring arms 24 apart, thereby moving the arms outwardly within the chordal openings 21 and as rotation continues the arms will be spread apart so as to be completely clear of the bore 4. In practice, when the arms 24 are spread as shown in FIG. 4, the resulting inward thrust of the arms against the arcuate body sections 22 produces a camming force on the locking member which tends to cause the same to shift laterally until the spring ends 27 engage the end walls of the adjacent chordal opening 21 to limit such shifting. It is now evident that the end walls of the chordal openings 21 in the coupling part 1 and the in-turned spring ends 27 on the locking element or member 23 provide, in effect, coacting shoulders on these parts which are disposed to abut when the locking member is rotated to its unlocking poesition of FIG. 4 and thereby yieldably restrain the member against inadvertent rotation to its locking position of FIG. 3. It will also be understood that the spring ends 27 prevent inadvertent lateral displacement of the spring locking member when it is in the position shown in FIG. 3.

Cooperative with the female coupling part 1 is the male coupling part 2, referred to above, which comprises a body 30 which, like body 3, may be of hexagonal form to facilitate the manual gripping of the same, and like body 3 the male body 30 has suitable means such as the threads 31 for connection with a conduit.

Extending longitudinally from the body 30 is a locking body section or member 32 having therein an external locking groove 33 spaced inwardly from a bevelled surface 34 at the lead end of the body section 32. One wall of the groove 33 constitutes radially extended abutment means engageable by the spring arms 24 and bevelled surface 34 constitutes camming means for spreading the arms upon insertion of the member 32 therebetween.

Disposed in a bore 35 through the body section 32 is a valve device including a head 36 at the outer extremity of a supporting stem 37. The stem 37 is centered within the bore 35 by means of a spider 38 secured to the stem as by peaning an end flange 39 into engagement with the inner margin of the spider, the spider engaging with an internal shoulder 40 and being retained within the body 30 by means of a resilient retainer ring 41. A coiled spring 42 engages the spider at one end and at its other end the spring 42 engages the inner extremity of a valve sleeve 43 which is slidably disposed within the bore 35.

Within the bore 35 is a sealing means preferably comprising a resilient seal ring 44 carried by the sleeve 43. At its outer end the sleeve 43 is adapted for engagement with a resilient valve sealing ring 45 carried by the head 36, the spring 42 urging the sleeve into contact with the seal ring 45 and also fluid pressure trapped within the coupling is effective to cause sealing engagement of the sleeve with the valve head. As seen in FIG. 2, the outer extremity of the valve sleeve 43 is adapted to engage the seal ring 6 within the female body part 1, upon interconnection of the coupling parts, and it will also be noted that the sleeve 43 will be caused to move longitudinally inward within bore 35 as the coupling parts are moved into association one with the other, with the result that the sleeve 43 is disengaged from the valve head 36. Simultaneously, the valve head 36 of the male coupling part will contact and move axially the valve head 9 in coupling part 1 so as to unseat the latter from engagement with the valve seat 8, thereby opening a flow passage through the coengaged coupling parts.

It will be understood that the bevelled surface 34 on the body section 32 of the coupling part 2 constitutes a cam surface engageable with the spring arms 24 of the locking spring member 23 upon insertion of the coupling part 2 into the coupling part 1, whereby to spread the spring arms 24 outwardly as the bevelled surface 34 passes therebetween, the spring arms 24 resiliently snapping into the locking groove 33 when the coupling part 2 is moved into the fully inserted position so as to engage the abutment means formed by one wall of groove 33. The coupling parts will accordingly be automatically interlocked by the spring locking member 23 for connecting the body parts and in order to disconnect the coupling parts it is simply necessary to rotate the spring element 23 90° in either direction. As noted above, such 90° revolution of the locking element 23 will cause the locking arms 24 to be cammed apart by the arcuate body sections 22 which intervene between the chordal openings 21 so that the locking arms 24 will be wholly displaced from within the groove 33 of the body part 2 and the coupling parts may then be axially separated.

However, inadvertent separation of the coupling parts is prevented due to the structure of the locking spring 23 in relation to the supporting means therefor and the abutment means on the male member. In this connection, the wire of which the locking spring 23 is formed is rectangular in cross-section, or at least has a face disposed radially relative to the body parts 1 and 2 for radial face-to-face engagement with the abutment wall of groove 33, as seen in FIG. 2. Moreover, the end projections 27 on the spring will prevent lateral displacement of the spring by engagement with one of the arcuate body section 22 when the spring is in the position shown in FIG. 3, and by engagement with both arcuate body sections 22 when the spring is in the position shown in FIG. 4.

While specific structural details have been shown and described, it should be understood that changes and alterations may be resorted to without departing from the spirit of the invention.

I claim:

1. A quick connect and disconnect coupling comprising: a pair of complemental substantially relatively non-rotatable coupling parts; one of said coupling parts having a bore, a circumferential groove, and a pair of chordal openings disposed in the bottom of said groove in a plane transverse to the axis of said bore and intersecting said bore at diametrically opposite locations and intervening body sections disposed between said chordal openings; a resilient locking member having a pair of locking arms having opposed axially facing flat sides straddling said one coupling part in said groove; means mounting said locking member for rotation in said plane about said one coupling part between a first locking position wherein said arms are disposed in said chordal openings and project into said bore and a second unlocking position wherein said arms straddle and are spread apart by said body sections; the other coupling part having a body portion complemental to and insertible into said bore and an inner circumferential flat radial shoulder on said body portion for receiving therebehind said locking arms upon insertion of said body portion into said bore when said locking arms are disposed in locking position in said openings, said flat shoulder engaging the flat surfaces on each of the locknig arms whereby said coupling parts when engaged may be locked against axial separation by said locking member in said locking position and held against inadvertent release during relative rotation of the locked coupling parts when said coupling is subjected to line pressure and vibrations, and released for axial separation by rotation of said locking member to said unlocking position; and said locking member including a connecting portion joining said locking arms at one end thereof providing a handle whereby said one coupling part may be grasped in one hand and said locking member may be rotated between said locking and unlocking positions by engagement of a finger of said hand with said connecting portion.

2. A coupling as defined in claim 1, including coacting shoulder means on said locking member and said one coupling part engageable upon rotation of said locking member to said unlocking position for yieldably retaining said member in the latter position.

References Cited

UNITED STATES PATENTS

| 1,514,130 | 11/1924 | Clements | 285—321 X |
| 1,881,980 | 10/1932 | Thomas | 285—305 |
| 2,436,208 | 2/1948 | Deming | 137—614.03 |
| 2,850,298 | 2/1958 | Clark | 137—614.03 |
| 2,854,259 | 9/1958 | Clark | 137—614.03 |
| 2,893,755 | 7/1959 | Flower | 137—614.03 |
| 3,039,794 | 6/1962 | De Cenzo | 137—614.03 |
| 3,097,867 | 7/1963 | Saloum | 137—614.03 X |

FOREIGN PATENTS 1,294,438    4/1962    France.

GEORGE F. MAUTZ, *Primary Examiner.*

U.S. Cl. X.R.

137—614.03